H. E. WHEELER.
BALING MACHINE.
APPLICATION FILED OCT. 25, 1912.

1,062,066.

Patented May 20, 1913.

WITNESSES
Oliver M. Kappler
Horace B. Fay

INVENTOR
Harry E. Wheeler
BY Fay and Oberlin
ATTORNEYS

UNITED STATES PATENT OFFICE.

HARRY E. WHEELER, OF CUYAHOGA FALLS, OHIO, ASSIGNOR TO THE TURNER, VAUGHN & TAYLOR COMPANY, OF CUYAHOGA FALLS, OHIO, A CORPORATION OF OHIO.

BALING-MACHINE.

1,062,066.  Specification of Letters Patent.  Patented May 20, 1913.

Application filed October 25, 1912. Serial No. 727,688.

*To all whom it may concern:*

Be it known that I, HARRY E. WHEELER, a citizen of the United States, and a resident of Cuyahoga Falls, county of Summit, and State of Ohio, have invented a new and useful Improvement in Baling-Machines, of which the following is a specification, the principle of the invention being herein explained and the best mode in which I have contemplated applying that principle, so as to distinguish it from other inventions.

The subject of the present invention is a baling machine which is designed to provide convenient and easily operated means for removing the baled material from the operating mandrel or drum. In former machines of this character it has been considerable of a problem to remove the mandrel after baling, and in many machines it is necessary to remove certain parts of the frame or to bodily remove the mandrel in order to free the baled material from the same. In the present invention it is only necessary to move a stripping frame or table away from the mandrel, such action positively removing the baled material from the mandrel.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

Figure 1:
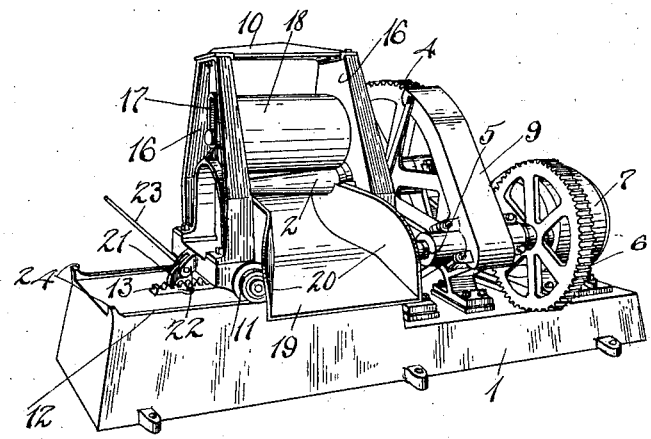
Figure 2:
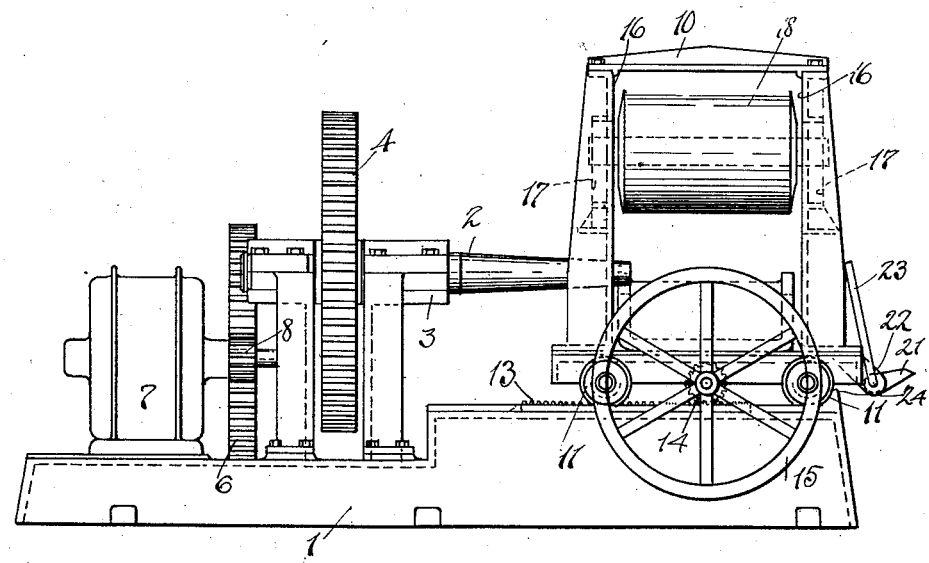

In said annexed drawing:—Figure 1 is a view in perspective of my improved machine showing the front and one end thereof; Fig. 2 is a side elevation of the rear of the machine.

Certain features of my invention are old in baling machines, such for example as the driving mechanism for the mandrel, and to these features I lay no claim.

The machine consists of a suitable base plate 1 upon which is horizontally mounted a rotatable mandrel 2 carried in suitable bearings 3 and adapted to be driven by means of a gear 4 fixed to rotate with the mandrel. A counter shaft 5 is mounted parallel with the mandrel shaft and bears a gear 6 driven from a motor 7 through a smaller gear 8. Such shaft 5 drives the gear 4 through a smaller gear not shown but inclosed in the housing 9. The precise means by which I drive the mandrel shaft are of course of no importance and are here referred to merely for the purpose of describing one means for such drive.

The mandrel shaft 2 is tapered from its supported end to its unsupported end. A stripping frame 10 is provided with wheels or rollers 11 which operate on rails 12 disposed along the sides of the base plate, thus adapting the frame to be reciprocated in a direction alined with the mandrel shaft. In other words, the stripping frame 10 may be moved up to the mandrel shaft to the position shown in Fig. 1, or away from the same as shown in Fig. 2. The means for moving the stripping frame comprise a rack 13 disposed on the base plate and engaged by a small pinion 14 fixed on a rotatably mounted transverse horizontal axis mounted in the frame. A hand wheel 15 is attached to the end of the shaft bearing the pinion, and by simply rotating this hand wheel the frame will be readily moved either to or from the mandrel according to the direction of rotation of the wheel.

The frame is provided with spaced vertical sides 16, each of which is provided with a vertical slot 17, in which slots there is mounted a roller or weight 18 adapted to coöperate with the mandrel in baling the material thereon, as will be readily understood.

Attached to the frame is a combined feed box and stripping plate 19 which consists of a guideway provided with sides 20, the inner of which is adapted to engage snugly against the larger or inner end of the mandrel when the frame is in its inoperative position as shown in Fig. 1. The material to be baled, the present machine being adapted to bale wire scraps preferably, is placed in the feed box 19 with the extending ends of the strands engaging the mandrel 2, and the mandrel being rotated the wire will be wound thereon, the roller 18 operating to press the wire firmly against the mandrel and to form a compact bale. It will be understood that the function of the feed box 19 is to guide the wire scraps and to prevent stray ends from being entangled in the gears or other moving parts of the machine. When the bale has reached a sufficient diameter, which is determined by the upper position of the roller, the stripping frame is moved away from the mandrel and the inner plate 20 is thus forced longitudinally along the mandrel. This plate 20 is of course in contact with the inner end of the newly formed bale and such movement therefore forces the bale longitudinally off from the mandrel. At the outer position of the stripping frame the bale will be completely disengaged from the mandrel (see Fig. 2). The bale will then fall into the feed box and may be removed to a suitable storage.

It is desirable to provide means for retaining the stripping frame in its inoperative position as in Fig. 1, and to this end I provide a pawl 21 pivoted between lugs 22 attached to the frame and adapted to engage the rack 13. A lever 23 is attached to the pawl for the purpose of operating the same. For convenience, I incline the outer ends of the tracks 12, as shown at 24, for the purpose of stopping the stripping frame upon its outward movement at the proper position. It will be understood that the means for thus stopping the frame on its outward movement and for retaining the same in its inner position may be of any suitable design, and those here illustrated are merely intended to indicate a simple and effective mechanism.

The advantage of the present baling machine will be readily seen. It is a simple matter to move the frame away from the mandrel, and such movement automatically and positively forces the bale from off the mandrel, such bale falling into the feed box and being delivered at the side of the machine. The simplicity of the construction is apparent, and while I here illustrate several gear wheels and two shafts for driving the mandrel it will be understood that in practice it may be possible to drive the mandrel directly from overhead shafting by a single belt or by suitable gear reduction to drive the mandrel shaft direct from a motor.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a machine of the character described, the combination with a suitable base; of a rotatable mandrel supported at one end on said base and adapted to receive material to be baled; and a stripping frame slidably mounted on said base to move in a direction parallel with said mandrel and through a distance equal to the length of said mandrel, said frame being independent of said mandrel but adapted to engage the material thereon and strip the same entirely from off said mandrel.

2. In a machine of the class described, the combination with a suitable base; of a rotatable mandrel supported from one end horizontally above said base and adapted to receive material to be baled; a frame slidably mounted on said base to move in a direction alined with said mandrel; and a combined feed box and stripping plate mounted on said frame and adapted in the normal inoperative position of said frame to guide material to be baled to said mandrel, said combined feed box and stripping plate being also adapted, upon movement of said frame away from said mandrel, to strip such baled material therefrom.

3. In a machine of the class described, the combination with a suitable base; of a rotatable mandrel supported from one end horizontally above said base and adapted to receive material to be baled; a frame slidably mounted on said base to move in a direction alined with said mandrel; a roller adjustably and rotatably mounted on said frame in a position to coöperate with said mandrel; and a combined feed box and stripping plate mounted on said frame and adapted in the normal inoperative position of said frame to guide material to be baled to said mandrel, said combined feed box and stripping plate being also adapted, upon movement of said frame away from said mandrel, to strip such baled material therefrom.

4. In a machine of the class described, the combination with a suitable base; of a rotatable mandrel supported from one end horizontally above said base and adapted to receive material to be baled; a frame slidably mounted on said base to move in a direction alined with said mandrel; a roller adjustably and rotatably mounted on said frame in a position to coöperate with said mandrel; and a combined feed box and stripping plate mounted on said frame and adapted in the normal inoperative position of said frame to guide material to be baled to said mandrel, said combined feed box and stripping plate being also adapted upon movement of said frame away from said mandrel, to strip such baled material therefrom; and means for retaining said frame in its inoperative position.

5. In a machine of the class described, the combination with a suitable base; of a rotatable mandrel supported from one end horizontally above said base and adapted to receive material to be baled; a frame slidably mounted on said base to move in a direction alined with said mandrel; a roller adjustably and rotatably mounted on said frame in a position to coöperate with said mandrel; and a combined feed box and stripping plate mounted on said frame and adapted in the normal inoperative position of said frame to guide materal to be baled to said mandrel, said combined feed box and stripping plate being also adapted, upon movement of said frame away from said mandrel, to strip such baled material therefrom; and means adapted to move said frame.

6. In a machine of the class described, the combination with a suitable base; of a rotatable mandrel supported from one end horizontally above said base and adapted to receive material to be baled; a frame slidably mounted on said base to move in a direction alined with said mandrel; a roller adjustably and rotatably mounted on said frame in a position to coöperate with said mandrel; and a combined feed box and stripping plate mounted on said frame and adapted in the normal inoperative position of said frame to guide material to be baled to said mandrel, said combined feed box and stripping plate being also adapted, upon movement of said frame away from said mandrel, to strip such baled material therefrom; and means adapted to move said frame, said means including a rack mounted on said base and a rotatable pinion mounted on said frame and engaging said rack.

7. In a machine of the character described, the combination with a suitable base; of a rotatable mandrel supported at one end on said base and adapted to receive material to be baled; a frame slidably mounted on said base to move in a direction parallel with said mandrel, said frame being independent of said mandrel but adapted to engage the material thereon and strip the same entirely off said mandrel; and a roller mounted in said frame and adapted to coöperate with said mandrel.

8. In a machine of the character described, the combination with a suitable base; of a rotatable mandrel supported at one end on said base and adapted to receive material to be baled; a frame slidably mounted on said base to move in a direction parallel with said mandrel, said frame being independent of said mandrel but adapted to engage the material thereon and strip the same entirely off said mandrel; and a roller adjustably and rotatably mounted in said frame and adapted to coöperate with said mandrel.

9. In a machine of the character described, the combination with a suitable base; of a rotatable mandrel supported at one end on said base and adapted to receive material to be baled; a frame slidably mounted on said base to move in a direction parallel with said mandrel, said frame being independent of said mandrel but adapted to engage the material thereon and strip the same entirely off said mandrel; said frame having parallel slots above the level of said mandrel; and a roller adjustably and rotatably mounted in such slots and adapted to coöperate with said mandrel.

10. In a machine of the character described, the combination with a suitable base; of a rotatable mandrel supported at one end of said base and adapted to receive material to be baled; and a combined stripping frame and box slidably mounted on said base to move in a direction parallel with said mandrel and through a distance equal to the length of said mandrel, said frame and box being independent of said mandrel but adapted to engage the material thereon to strip the same entirely from off said mandrel, the material then being received in said box.

Signed by me this 24th day of Oct., 1912.

HARRY E. WHEELER.

Attested by—
L. A. VAUGHN,
LOUISE M. MILLER.

---

Copies of this patent may be obtained for five cents each, by addressing the "Commissioner of Patents, Washington, D. C."